United States Patent [19]
Chuan

[11] Patent Number: 5,862,540
[45] Date of Patent: Jan. 26, 1999

[54] PORTABLE KITCHEN, TOILET AND SHOWER UNIT

[76] Inventor: Michael Kuek Sze Chuan, 337 Rose Garden Off Poh Kwong Park Green Road, 93150 Kuching Sarawak, Malaysia

[21] Appl. No.: 846,675

[22] Filed: Apr. 30, 1997

[30] Foreign Application Priority Data

Jun. 12, 1996 [MY] Malaysia .................. PI 9602446

[51] Int. Cl.$^6$ ................................ A47K 11/02
[52] U.S. Cl. ........................ 4/449; 4/599; 4/626
[58] Field of Search ............... 4/449, 460, 479, 4/483, 599, 625, 626, 663, 664; 296/160, 161; 312/236, 237

[56] References Cited

U.S. PATENT DOCUMENTS

| | | | |
|---|---|---|---|
| 4,215,445 | 8/1980 | Antos et al. ................ | 4/323 |
| 4,457,553 | 7/1984 | Larkin ...................... | 296/160 |
| 4,867,502 | 9/1989 | Sylvester et al. ............ | 296/161 |

FOREIGN PATENT DOCUMENTS

| 2 166 851 | 8/1973 | France . |
|---|---|---|
| 2 655 240 | 6/1991 | France . |

*Primary Examiner*—Robert M. Fetsuga
*Attorney, Agent, or Firm*—Edwin D. Schindler

[57] ABSTRACT

A portable kitchen, toilet and shower unit includes a sink bowl (6), a sink tap (8) for the sink bowl, a work top (10), at least one cupboard (12,16) positioned beneath the sink bowl and the work top, at least one water container (18,20) in the cupboard, a portable chemical toilet, first conduit device (22) connecting the water container to the sink tap, a shower hose (24), shower head (26) and a stored shower enclosure (40) to attach to a rear door (46) of the vehicle, second conduit device (28) connecting the water container to the shower hose, and an electrically-operated pump (32) for pumping water from the container to the sink tap and the shower hose.

8 Claims, 5 Drawing Sheets

PORTABLE KITCHEN, TOILET AND SHOWER UNIT

TECHNICAL FIELD

This invention relates to a portable combination of kitchen, toilet, shower & shower enclosed unit and, more especially, this invention may be used for camping vehicles, touring vehicles and boats, and at camp sites, remote construction sites, and isolated farm houses.

BACKGROUND ART

When people are on touring or camping holidays, or at remote locations, kitchen and washing facilities are often non-existent or extremely basic. This in turn means that normally simple things such for example as washing crockery or taking a shower become difficult and may detract from the overall enjoyment of a holiday.

SUMMARY OF INVENTION

It is an aim of the present invention to reduce the above mentioned problems.

Accordingly, in one non-limiting embodiment of the present invention, there is provided a portable sink and shower unit, which unit comprises a sink bowl, a sink tap for the sink bowl, a work top, at least one cupboard positioned beneath the sink bowl and the work top, at least one water container in the cupboard, first conduit means connecting the water container to the sink tap, a shower hose and shower head stored in the unit, second conduit means connecting the water container to the shower hose, and an electrically-operated pump for pumping water from the water container to the sink tap and the shower hose.

Because the sink and shower unit of the present invention is portable, and because it is able to provide washing up facilities via the sink bowl and personal washing facilities via the shower hose and shower head, the sink and shower unit is extremely useful for persons on holiday in touring vans or tents and also for persons generally in remote locations where normal mains facilities are not available.

Preferably, the unit includes gas-operated cooking apparatus which is operated from a gas container. The gas container will usually be a cannister but a larger cylinder may be employed if desired. The gas-operated cooking apparatus will usually be positioned on top of the unit adjacent the work top.

The unit may include an ice cooler box. The ice cooler box is useful for providing cooled drinks and for keeping food.

The unit may include a portable chemical toilet.

Preferably there are two of the water containers. A single water container or more than two water containers may however be employed if desired.

Preferably, there are three of the cupboards.

The unit may be one in which a first one of the cupboards contains two water containers, and in which a second one of the cupboards contains a pump and the shower hose and shower head.

The unit may be one in which the second one of the cupboards also contains the ice cooler box, and in which a third one of the cupboards contains the chemical toilet.

The unit may include a stored shower enclosure made of a foldable water-resistant material. Any suitable and appropriate foldable water-resistant materials may be employed such for example as nylon sheet material, polyethylene sheet material or other plastics sheet material. The foldable water-resistant material will usually be non-transparent in order to give required privacy.

Advantageously, the unit is of such a size and construction that it is able to be positioned in the back of a vehicle having rear door access, the unit being such that it is positionable across the vehicle as a free-standing unit and, when so positioned, the unit permits normal opening and closing of the vehicle rear door or doors, and the unit is positioned ready for immediate use on opening of the vehicle rear door or doors.

Preferably, the unit is one in which the shower enclosure is constructed and adapted to hang from a rear door of the vehicle when the vehicle is of a type having a single rear door which opens upwardly about upper hinges.

An embodiment of the invention will now be described solely by way of example and with reference to the accompanying drawings in which.

Figure 1:
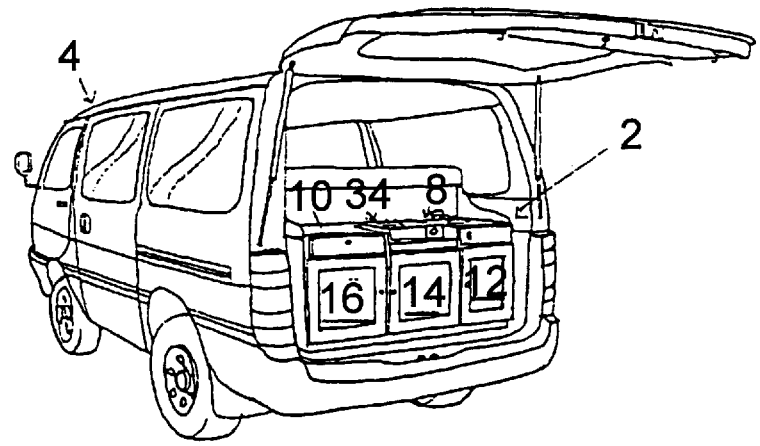
FIG. 1 shows a portable sink and shower unit positioned in the back of a vehicle.

Referring to the drawings, there is shown a portable sink and shower unit fitted in the back of a four wheeled drive vehicle 4. The unit 2 comprises a bowl 6, a sink tap 8 for the sink bowl 6, and a work top 10. The unit 2 has first, second and third cupboards 12, 14, 16 positioned beneath the sink bowl 6 and the work top 10.

The first cupboard 12 has two water containers 18, 20. First conduit means 22 is provided for connecting the water containers 18, 20 to the sink tap 8.

Figure 4:
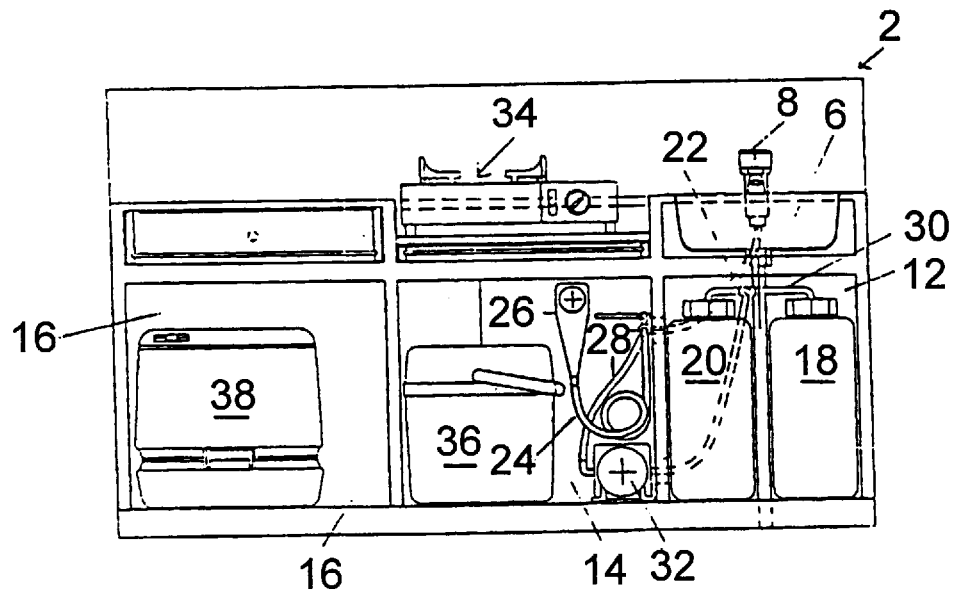
FIG. 4 is a longitudinal section in a vertical plane through the unit shown in FIG. 3.
Figure 5:
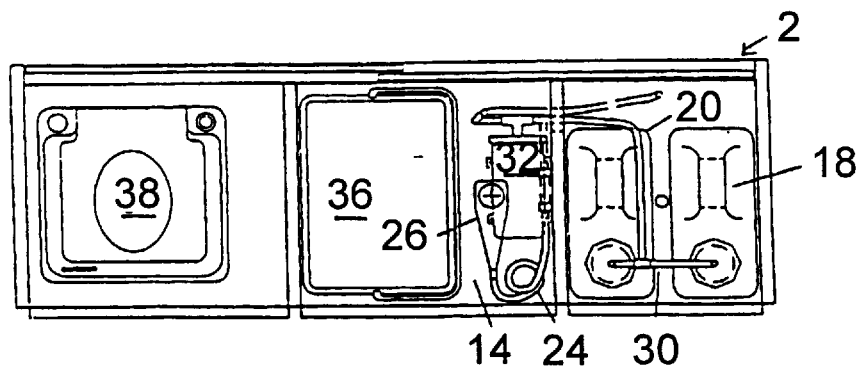
FIG. 5 is a longitudinal section in a horizontal plane through the unit shown in FIG. 3.
Figure 6:
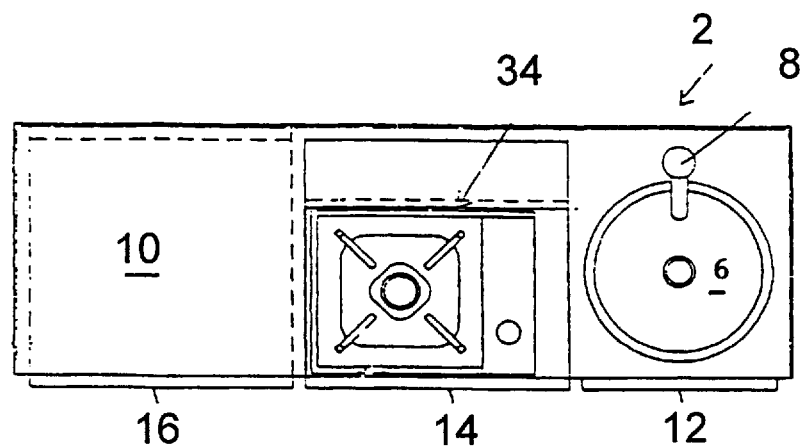
FIG. 6 is a top plan view of the unit shown in FIG. 3.
Figure 7:
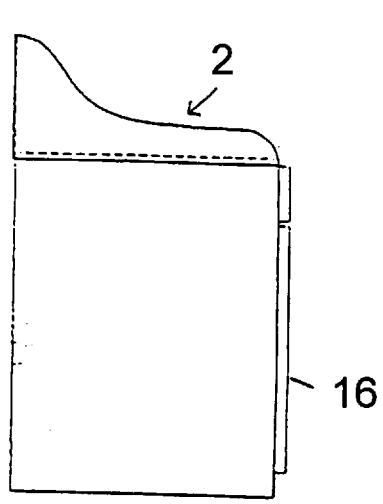
FIG. 7 is a side view of the unit shown in FIG. 3.
Figure 8:
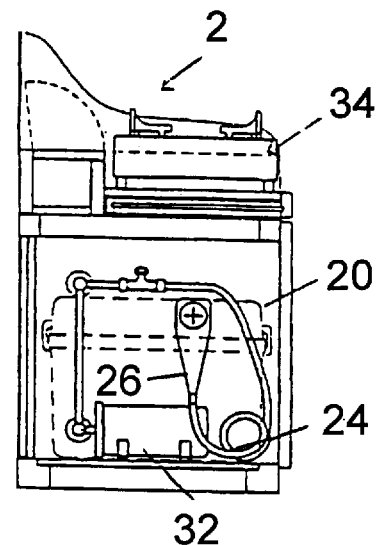
FIG. 8 is a cross section in a vertical plane through the unit shown in FIG. 3.

The unit 2 is such that a shower hose 24 and a shower head 26 are stored in the second cupboard 14. Second conduit means 28 connects the water containers 18, 20 to the shower hose 24. As can be seen from FIGS. 4 and 5, the water containers 18, 20 are connected together by third conduit means 30. An electrically-operated pump 32 is provided in the second cupboard 14 for pumping water from the water containers 18, 20 to the sink tap 8 and the shower hose 24.

The unit 2 includes gas-operated cooking apparatus 34. The cooking apparatus 34 is positioned in a top part of the unit 2 between the sink bowl 6 and the work top 10. The cooking apparatus 34 is operated from a gas cannister (not shown).

The unit 2 includes an ice cooler box 36 which is positioned in the second cupboard 14.

The unit 2 also includes a portable chemical toilet 38 which is positioned in the third cupboard 16.

Figure 9:
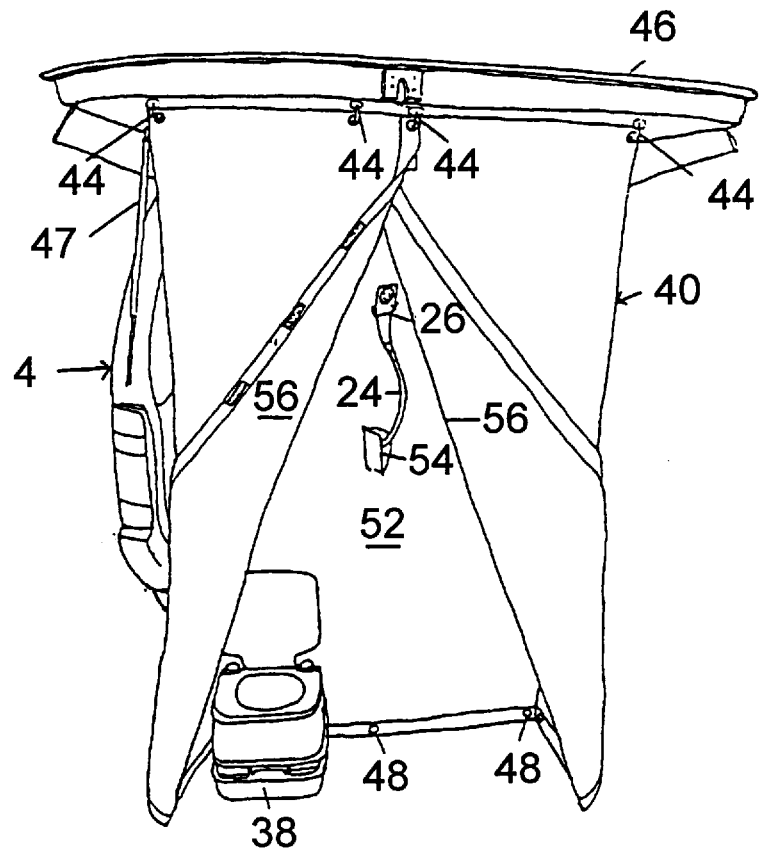
FIG. 9 shows the unit as in FIG. 1 but with an assembled shower enclosure.
Figure 10:
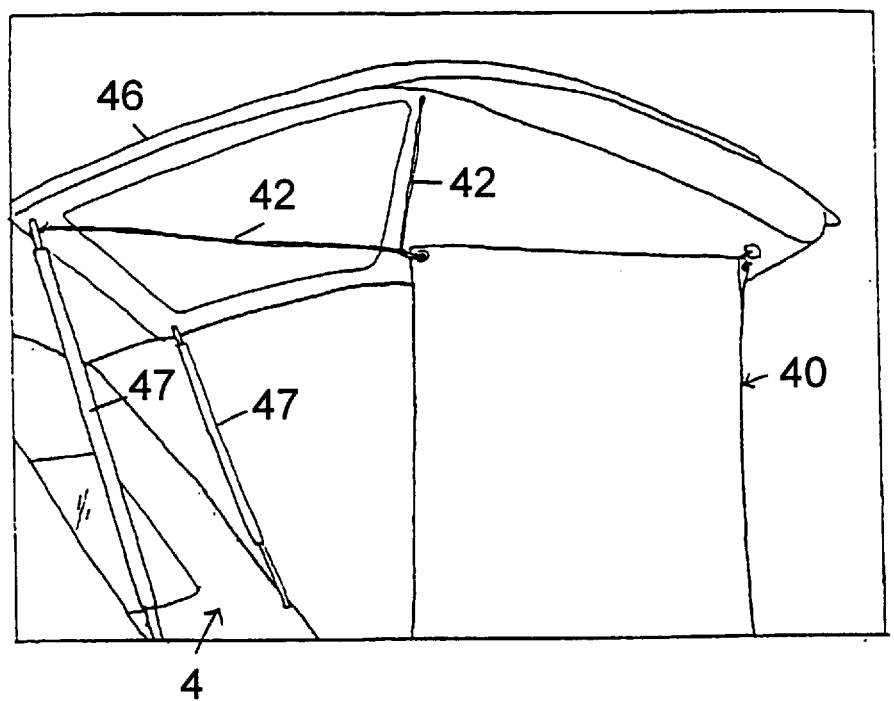
FIG. 10 is a side view of part of the assembled shower enclosure as shown in FIG. 9.

Any one of the first, second and third cupboards 12, 14, 16 may contain a stored shower enclosure made of a foldable water-resistant material. FIGS. 9 and 10 show the shower enclosure 40 in an unfolded assembled condition in which is hanging from cord 42 passing through hooks 44 on a raised rear door 46 of the vehicle 4. The rear door 46 raises on piston and cylinder struts 47.

Figure 11:
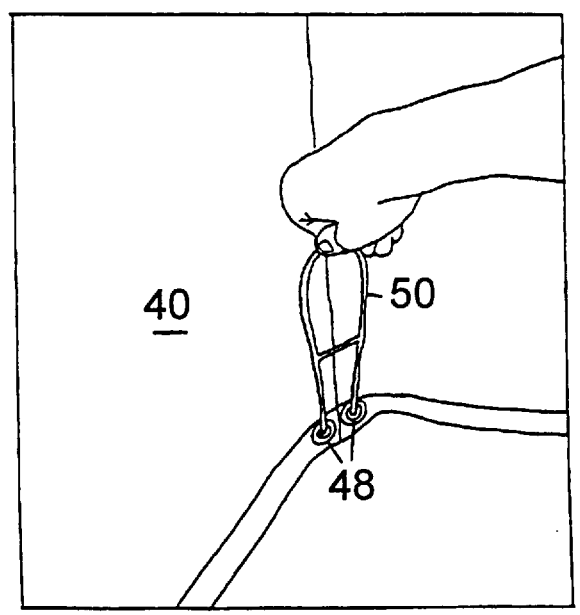
FIG. 11 shows how the base of the shower enclosure is secured to the ground.

FIG. 11 shows how the edge of the shower enclosure 40 is provided with eyelets 48, pairs of which eyelets receive a two pronged device 50 which is pushed into the ground in order to keep the bottom of the shower enclosure 40 firmly secured to the ground during use as shown in FIGS. 9 and 10.

FIG. 9 also shows how the portable chemical toilet 38 may be positioned in the shower enclosure 40. A rear wall 52 of the shower enclosure is provided with an opening 54 so that the shower hose 24 and the shower head 26 can be passed through the opening 54 and suspended from a cord or other means (not shown) in the shower enclosure 40 in a position convenient for use. The shower enclosure 40 has a closeable front portion 56 forming an entrance as can best be appreciated from FIG. 9.

Figure 2:
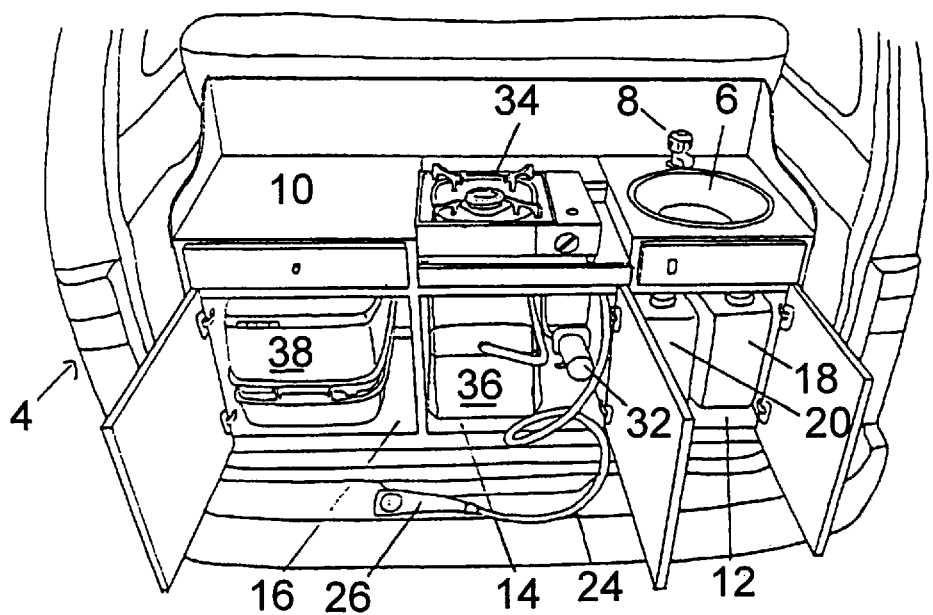
FIG. 2 is an enlarged perspective view of the unit in the vehicle as shown in FIG. 1.
Figure 3:
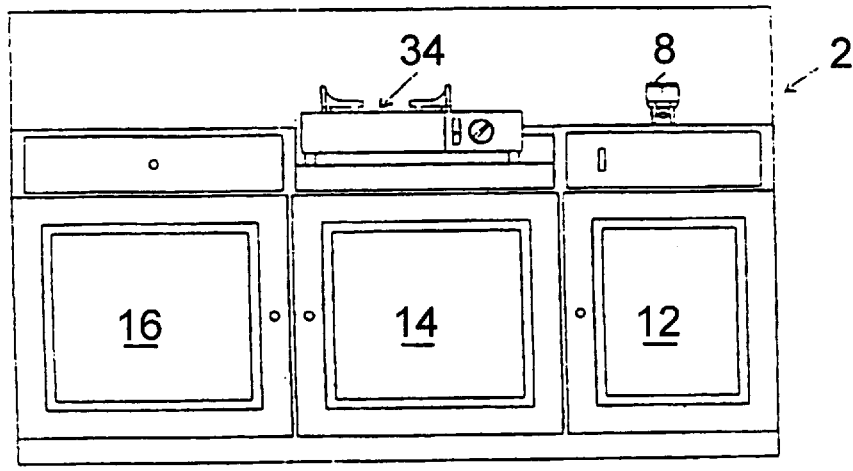
FIG. 3 is a front view of the unit shown in FIG. 1.

As can be seen from FIGS. 1 and 2, the unit 2 is of such a size and construction that if it is able to be positioned in the back of the vehicle 4. The unit 2 is positioned across the vehicle 4 as a free-standing unit. When the vehicle is positioned as shown in FIGS. 1 and 2, then the unit 2 permits normal opening and closing of the vehicle rear door 46. Still further, when the rear door 46 is opened, the unit 2 is perfectly positioned ready for immediate use. The unit 2 is arranged such that the sink bowl 6 and the work top 10 are exactly the required height for ease of working. After a touring or camping holiday, the unit 2 can easily be removed since it is completely self-contained and simply requires pulling out of the vehicle 4 and storing. The vehicle 4 can then be used for normal everyday use until such time as the unit 2 is again required.

It will be apparent that the unit 2 is a very small, purpose-built highly convenient unit 2 which can provide a plurality of washing and cooking facilities so essential to every day living and the full enjoyment of a holiday.

It is to be appreciated that the embodiment of the invention described above with reference to the accompanying drawings has been given by way of example only and that modifications may be effected. Thus, for example, the pump 32 could be positioned in the first cupboard 12 instead of the second cupboard 14. A single water container could be employed instead of the two water containers 18, 20. The first, second and third cupboards 12, 14, 16 could be formed as one single cupboard or, indeed, more than three cupboards could be formed if desired. The unit 2 may be positioned in vehicles other than the vehicle 4, and the unit 2 may also be positioned in other constructions, such for example as boats, tents and huts.

I claim:

1. A portable kitchen, toilet and shower unit, comprising:

a sink bowl;

a sink tap for said sink bowl;

a work top;

a plurality of cupboards positioned beneath said sink bowl and said work top;

a water container in, at least, a first cupboard of said plurality of cupboards;

first conduit means connecting said water container to said sink tap;

shower means including a shower hose and a shower head and within a second cupboard of said plurality of cupboards, and a shower enclosure;

a portable chemical toilet located within a third cupboard of said plurality of cupboards;

second conduit means connecting said water container to said shower hose of said shower means; and, an electrically-operated pump for pumping water from said water container to said sink tap and said shower hose, said portable kitchen, toilet and shower unit being structured to be positionable, at the discretion of a user, as a free-standing unit in a rear portion of a vehicle.

2. The portable kitchen, toilet and shower unit according to claim 1, further comprising cooking apparatus positioned on top of said portable kitchen, toilet and shower unit adjacent to said work top.

3. The portable kitchen, toilet and shower unit according to claim 1, further comprising a cooler box positioned in at least one of said plurality of cupboards.

4. The portable kitchen, toilet and shower unit according to claim 1, wherein said shower enclosure is made of a foldable water-resistant material.

5. The portable kitchen, toilet and shower unit according to claim 4, wherein said foldable water-resistant material is non-transparent.

6. The portable kitchen, toilet and shower unit according to claim 1, further comprising eyelets securable to a ground surface, wherein said shower enclosure is secured to the ground surface using a two-pronged device inserted through said eyelets to the ground surface.

7. The portable kitchen, toilet and shower unit according to claim 1, wherein said shower enclosure is adaptable for hanging from a rear door of the vehicle.

8. The portable kitchen, toilet and shower unit according to claim 7, wherein said shower enclosure is adaptable for hanging from a rear door of the vehicle, when the vehicle includes a single rear door openable upwardly about upper hinges.

\* \* \* \* \*